United States Patent
Bause et al.

(10) Patent No.: US 9,792,390 B2
(45) Date of Patent: Oct. 17, 2017

(54) METADATA/CONTENT RE-ASSOCIATION SYSTEM AND METHOD

(75) Inventors: Thomas Bause, Brooklyn, NY (US); Michael Shane Wilkinson, Newhall, CA (US); Sheau Bao Ng, Wayland, MA (US)

(73) Assignee: NBCUniveral Media, LLC, Wilmington, DE (US)

( * ) Notice: Subject to any disclaimer, the term of this patent is extended or adjusted under 35 U.S.C. 154(b) by 1572 days.

(21) Appl. No.: 12/847,930

(22) Filed: Jul. 30, 2010

(65) Prior Publication Data

US 2012/0030209 A1    Feb. 2, 2012

(51) Int. Cl.
| | |
|---|---|
| *G06F 17/00* | (2006.01) |
| *G06F 17/30* | (2006.01) |
| *H04N 21/231* | (2011.01) |
| *H04N 21/8358* | (2011.01) |
| *H04N 21/84* | (2011.01) |
| *H04N 21/845* | (2011.01) |
| *H04N 21/854* | (2011.01) |

(52) U.S. Cl.
CPC .... *G06F 17/30997* (2013.01); *G06F 17/3002* (2013.01); *H04N 21/23109* (2013.01); *H04N 21/8358* (2013.01); *H04N 21/84* (2013.01); *H04N 21/8455* (2013.01); *H04N 21/8456* (2013.01); *H04N 21/85406* (2013.01)

(58) Field of Classification Search
CPC .................................................. G06F 17/3028
USPC ........................................... 707/999.104, 667
See application file for complete search history.

(56) References Cited

U.S. PATENT DOCUMENTS

| | | | |
|---|---|---|---|
| 2007/0266252 A1* | 11/2007 | Davis | G06F 21/10 713/176 |
| 2007/0299888 A1* | 12/2007 | Thornton | G06F 17/3028 |
| 2008/0059609 A1 | 3/2008 | Ng et al. | |
| 2009/0259623 A1* | 10/2009 | Mooneyham | G06F 17/30038 |
| 2010/0146013 A1* | 6/2010 | Mather | G06F 17/30067 707/803 |
| 2010/0306467 A1* | 12/2010 | Pruthi | G06F 3/0611 711/114 |
| 2011/0252070 A1* | 10/2011 | Khosrowpour | G06F 17/3002 707/802 |
| 2014/0032478 A1* | 1/2014 | McAfee | G06F 17/2247 707/601 |

* cited by examiner

*Primary Examiner* — Mark D Featherstone
*Assistant Examiner* — Eliyah S Harper
(74) *Attorney, Agent, or Firm* — Fletcher Yoder, P.C.

(57) ABSTRACT

Digital content, such as video, audio, multimedia, and similar files may be associated with metadata that is in some manner descriptive of the content by means of a unique identifier generated based on the content or a portion of the content. The two may be packaged in a wrapper. If the content is separated from the metadata, such as by circulation in a non-compliant environment, the content may be recognized by a regeneration of the identifier. Based upon the re-created identifier, the metadata may be re-associated with the content. Other scenarios may include generation of compilations for files that are not included in a wrapper with content and metadata, content that becomes dissociated with metadata by transcoding, and so forth.

23 Claims, 3 Drawing Sheets

METADATA/CONTENT RE-ASSOCIATION SYSTEM AND METHOD

BACKGROUND OF THE INVENTION

The present invention relates generally to the field of digital content, such as video, audio, multi-media and other content, and more particularly to techniques for associating such content with metadata descriptive of the content via a persistent identifier.

A wide range of digital content has been converted from legacy content on supports such as film, and an ever-increasing amount of digital content is being created directly through digital media. Such digital content may include, for example, television programming, movies, videos, audio files (e.g., music), and so forth. The content is typically stored on read/write memory supports or on read-only memory supports. Standards have been developed in recent years for associating such content with metadata that can include a wide range of information relating to the content itself. For example, one well-known technology that is under development is sometimes referred to as Material eXchange Format (MXF), which allows for creation of containers that are formatted to include both content and metadata. The MXF "container" or "wrapper" format supports a number of different streams of coded content, sometimes referred to as "essence", encoded with any of a variety of codes, together with the metadata. It should be noted that the MXF standards are but one form of packaging of content and metadata. Many other formats and schemes may be envisaged and utilized, as discussed in detail in the following sections of this disclosure.

Such open technologies have been designed to address problems with other file formats and wrapper technologies, such as time coding (e.g., time stamping), metadata support, and so forth. Current versions of such technology, being maintained or extended by the Society of Motion Picture and Television Engineers (SMPTE), provide for professional-level file creation, analysis, and use. Moreover, standards for sets of descriptive metadata for use with MXF files are under development. Certain standards call for metadata registries that may contain both public and private metadata elements. For example, metadata may include names of the content or essence, descriptions, identifiers, and other metadata for association with the essence and with still further metadata. Without such metadata, the content may be simply unidentified, untraceable, and many operations, such as licensing, authorized dissemination, authorized storage and playback, and so forth may be difficult or impossible.

In a scheme such as MXF, while wrappers are particularly useful for holding such metadata about the content, such metadata and content may remain associated throughout the lifecycle of the MXF wrapper only so long as the wrapper stays in a compliant environment. Once the content leaves the environment, the metadata and its connection with the content are no longer directly linked. A simple and common example of this occurs when a file is played out to tape or through any baseband processing equipment. The associated metadata is not carried along with the tape unless there is a manual connection made, and even when made, this connection is only as good as the process that is used to oversee that the data is updated. Once the asset is captured back into the electronic workflow, the metadata can then be tagged back to the content. This tagging process, however, if it occurs at all, is manual, leaving substantial potential for human error. Moreover, the parent/child relationship between the file that left the compliant environment and the altered file will only be present if the connection is manually made. This, furthermore, can be both time consuming and expensive, and is prone to error.

There is a need, therefore, for improved techniques for packaging and associating metadata with digital content. There is a particular need for techniques that can allow for reliable and at least partially automated re-association of digital content with metadata, based upon a persistent identifier, that can be used when the metadata is stripped from the content or the content is removed from a compliant environment.

BRIEF DESCRIPTION OF THE INVENTION

The present invention provides a novel technique designed to respond to such needs. In accordance with one aspect of the invention, a system for processing digital content comprises an identifier creation component configured to create a unique identifier derived from at least a portion of digital content in a content file. An association component is configured to associate metadata with the content via the unique identifier. A database is provided that is configured to store the association. A receiving component is then configured to receive the content dissociated from the metadata, and an identifier re-creation component is configured to re-create the identifier based upon the received content. A comparison component is configured to compare the re-created identifier with the unique identifier for re-association of the metadata with the content.

The invention also provides methods for carrying out such functionality. In accordance with one embodiment of such a method, a unique identifier is derived from at least a portion of digital content in a content file, and metadata descriptive of the content is associated with the content via the unique identifier. Data representative of the association is stored. When at least a portion of the content dissociated from the metadata is received, then, the identifier is re-created based upon the received content. The re-created identifier is compared with the unique identifier for re-association of the metadata with the content, and the association is created or re-created based upon the comparison and the data representative of the association.

In another embodiment of the method, at least a portion of digital content is received that is dissociated from metadata descriptive of the content. An identifier is re-created based upon the received content, and compared with a unique identifier stored in a database that associates the content with the metadata. An association is then created or re-created between the received content and the metadata based upon the comparison. A system for carrying out the method is also provided.

The invention further provides computer executable code stored on machine readable media that is capable of carrying out the methods, and of creating a system in accordance with such functionality.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
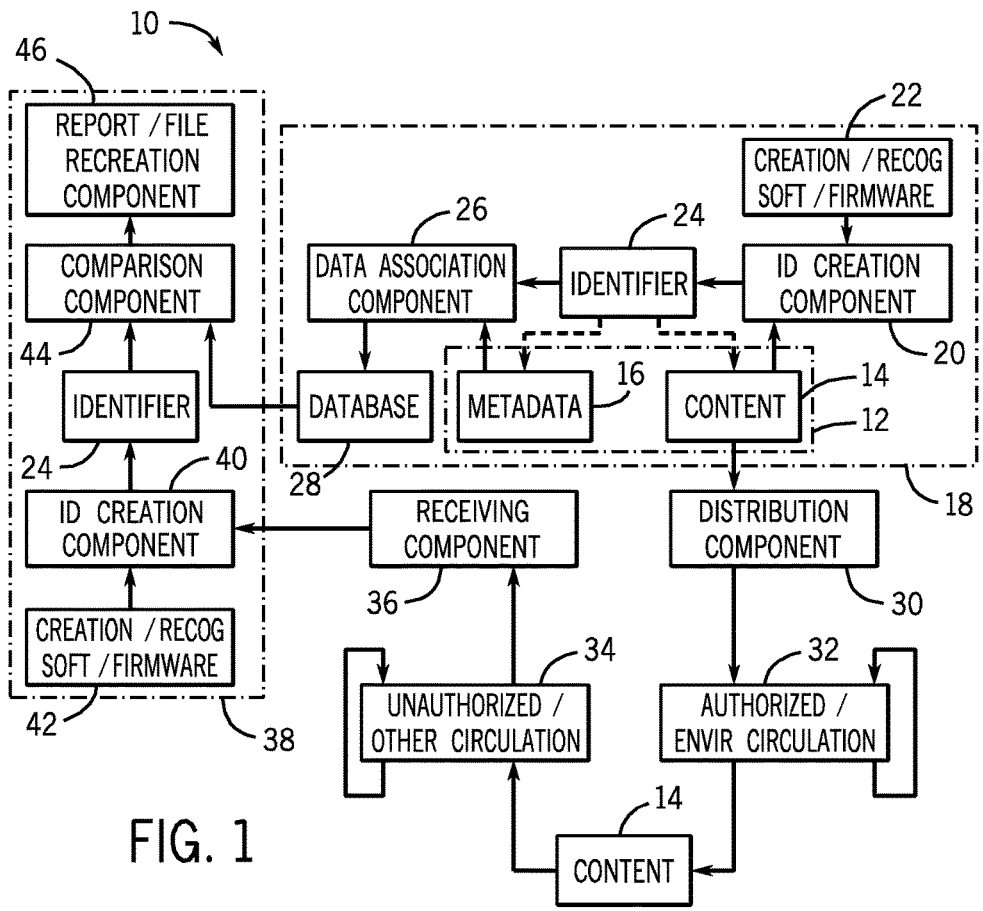
FIG. 1 is a diagrammatical overview of a digital content processing system that permits association and re-association of metadata with digital content.

Turning now to the drawings, and referring first to FIG. 1, a content processing system 10 is illustrated diagrammatically, that may form part of a digital asset management (DAM) system, a media asset management (MAM) system or a content management system (CMS), all of which may be considered forms of DAM systems. In general, such systems may allow for the control of storing, reproducing, ingestion, annotation, cataloging, retrieval and distribution of digital assets, such as photographs, movies, television productions, animations, video, music and other audio productions, and so forth. Such systems may also facilitate the production of these assets, as well as production of derivative works, and the packaging of such works for distribution to audiences and to post-production companies that themselves will ultimately consume or deliver the content for consumption by audiences.

In the illustrated example, the system 10 is focused on a file 12 that itself may a collection of files. In this case file 12 may be a wrapper, such as an MXF wrapper. The wrapper may include multiple files, such as a content file 14 and a metadata file 16. Of particular interest is content that includes video and/or audio data of interest to particular audiences. In practice, several content files (e.g., multiple video clips, sequences, versions, etc.) may be included in the wrapper, as may be several metadata-only files. It should also be noted that the term "files", as used in the present discussion, may include both stored data and streaming content. The content, depending upon the processing contexts, may sometimes be referred to as an asset or essence. The metadata 16 will typically relate to the content and may provide such information as title, identifying data, source, various date and time stamps, and so forth. The metadata may be used to track the content and therefore facilitate its management through production, post production, storage, retrieval, commercial and non-commercial distribution, and so forth. So long as the content 14 and the metadata 16 are associated in wrapper 12, these may be copied, stored, and otherwise distributed and transferred in a compliant environment such that the metadata is always available (sometimes through the use of a specialized reader) to describe the content.

For the purposes of the present discussion, an association system 18 is illustrated that facilitates creating the wrapper and associating the content 14 with the metadata 16. The association system 18 will typically include one or more appropriately programmed computers as described below. Moreover, the association system allows for creation of identifying data corresponding to the content and the association, via such data, of the content and with the metadata. The identifying information may then be used at the outset to create a stable and reference association between the content and the metadata that can be re-established when desired.

In general, the techniques described therein allow for the use of audio and/or video content recognition tools in a management workflow that are tied to metadata standards to automatically track content as it moves through different stages of production, post-production, storage, retrieval, distribution, and so forth. In certain scenarios, when an asset leaves a compliant digital file environment, it may be tracked electronically and when the same element or a derivative of that content re-enters the environment, it may be automatically detected, such as through the use of fingerprint detection technology, and logged back into the system along with the appropriate metadata acquired by the processing system. The processing system may be used to initially create the association, or it may act upon existing associations and simply re-associate files with metadata already created. Moreover, the system may assist in identifying and removing redundant copies of files (by recognizing incoming files as already existing in the system), thus reducing storage needs. The system also allows for tighter controls of content for security purposes and permits verification that information contained in metadata actually reflects the proper content. As described more fully below, in other contexts, the system may be used to associate metadata and content upon compilation of works for distribution, and may re-associate dissociated metadata with content after the content is transcoded.

Returning to FIG. 1, then, the association system 18 includes an identifier creation component 20 which creates one or more unique identifiers for the content 14. The identifier creation component 20 may use any suitable software or firmware as indicated by reference numeral 22. Such software or firmware is of a generally known type, and may serve to create fingerprints, watermarks, or any other unique identifier derived from the content as a whole, part of the content, or even for one or more frames (for video files). Thus, the identifier data, indicated by reference numeral 24, created by component 20 will uniquely identify the content 14 or a portion of the content for association with the metadata 16. It should be noted that in the present context, the features from which the fingerprint is generated is considered a unique and persistent identifier of the content. That is, such features are part and parcel of the content and, when the content is present, so long as the same fingerprint generation and recognition algorithm is employed, will result in the same identifying data. It should also be noted that in some cases, persistent identifiers may include coded data, such as fingerprints, that accompany or are packaged with the content and that can be recognized or extracted for later re-association of the content with descriptive metadata. In general, then, the features present in the content will be "persistent" and can be the basis of the generated and re-generated fingerprint, and the fingerprint itself is "a persistent identifier" in the database used to maintain and re-create an association with the metadata as discussed below.

The identifier 24 is provided to a data association component 26 for association with metadata 16. It should be noted that component 26 may also create some or all of the metadata 16 if not already created, and such metadata may comply with any known standard for digital content metadata, or may be non-standard-compliant. The identifier 24 may also be applied to or included in the content itself and/or in the metadata 16. For example, a watermark identifier may be inserted into the content 14, or code reflecting the identifier (e.g., derived from the indentifier or linked or pointing to the indentifier) may be stored in the metadata 16. The data association component 26, then, will either create or add to a database 28 with entries corresponding to the metadata 16, the content 14, and the identifier 24. The identifier may then serve as a key to re-association of the content with the metadata.

As noted above, the content and metadata may normally be intended to remain within a compliant environment in which the metadata and content will remain associated with one another, such as via the wrapper 12. Thus, the system may make use of a distribution component 30 which may include one or many computer systems, storage devices, distribution channels, and so forth such that the content may be utilized for the satisfaction of a target audience. In general, such authorized/environment circulation, indicated by reference numeral 32, will occur in a relatively controlled manner. However, for various reasons, the content may be stripped from the metadata or vice versa, or portions of the content may be pirated, copied, or otherwise distributed as indicated by the unauthorized/other circulation block 34. It should be noted that although block 34 indicates "unauthorized" circulation, various authorized file storage, transfer, playback and other processes may simply result in loss of some or all of the metadata, or release the content from the metadata without nefarious intent. Regardless of the events that lead to the disassociation of the content from the metadata, the content may be separated and, if the content becomes re-available to the system 10, it can be re-associated with the metadata by use of the identifier 24.

That is, at some point, the content may return from circulation to the system via a receiving component 36, which may be, again, an appropriately programmed computer that recognizes the content as not being associated with metadata. The receiving component then transfers the content (or a portion of the content) to a re-association system 38 that includes an identifier re-creation/recognition component 40. This component, configured to execute identifier creation/recognition software or firmware 42, is capable of recreating the identifier 24 based upon the received content or portion of the content. The re-association system 38 may be a subset of the content processing system 10, or may be somewhat separate from the system. It should be borne in mind that the re-association system 38 and indeed many components of the content processing system 10 may be located in different locations, or may be distributed widely and coordinated with one another, particularly in a large organization. Moreover, certain of these components may be present in and operate within entirely separate environments, such as content distribution chains, clearing houses, content creation of companies, and so forth.

The identifier 24 is recreated by component 40 in much the same way as it was originally created by the identifier creation component 20. That is, the identifier may be created based upon analysis of the content to determine unique features of the content, used to create digital fingerprints, watermarks, and so forth that serve as unique identifiers. It should be noted, however, that the component 40 may also recognize any identifiers that are still present in the content, such as watermarks. Similarly, the component may generate the same identifier 24 or somewhat different identifiers, particularly where content has been modified or altered (e.g., creating a derivative work) when outside the compliant environment.

The identifier is then passed to a comparison component 44 where an attempt is made to associate the identifier with one or more entries in the database 28. As noted above, data association component 26 stores the identifier or data derived from the identifier (or a link or pointer) in the database 28. If the identifier is located in the database 28, the content may be re-associated with the metadata based upon the entries in the database. Whether the content is identified or not, a report to that effect may be generated by a report/file recreation component 46 that allows for a user to determine whether content has been retrieved, whether the content has been altered, whether the content is merely redundant with already-stored content, and so forth. It should be noted that component 46 may re-establish a wrapper 12 that will include the retrieved content 14 returning to the system as well as the metadata 16 based upon the identifier 24 and the entries in the database 28.

Figure 2:
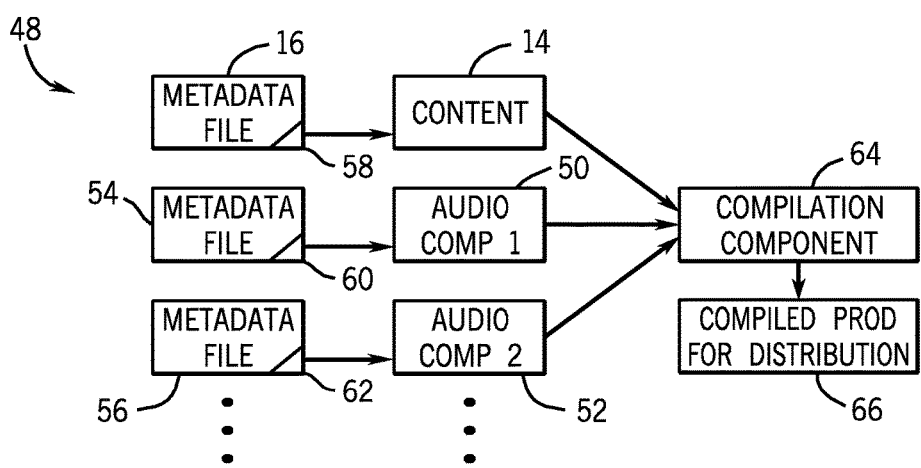
FIG. 2 is a diagrammatical representation of a possible alternative scenario in which metadata and content files may be associated with one another in accordance with the present techniques.

The present techniques allow for a number of different scenarios to be addressed in addition to the exiting of content from a controlled environment. For example FIG. 2 illustrates an example of another scenario in which the system described in FIG. 1 may be used for association or re-association of content with metadata. In this compilation scenario 48, various components are available for association with one another to compile products that may be of interest to particular audiences. For example, content 14 may include video content and certain components for reproduction and viewing by an audience. Other components, such as audio components 50 and 52 may include files that can be associated with the content 14 to produce particular compilations, such as movies and television productions in different languages, productions having particular scenes and not other scenes, and so forth.

In the scenario illustrated in FIG. 2, a metadata file 16 is associated with the content 14, while additional metadata files 54 and 56 are associated with components 50 and 52, respectively. In this scenario, no wrapper 12 is provided, but the metadata files include pointers to the respective content files as indicated by references 58, 60 and 62, respectively. A wide range of other content files and metadata files may also be provided to allow for many different combinations of content that can be grouped in compilations for specific audiences of interest (e.g., in different countries, in different formats, in different languages, etc.). Various content files may be grouped by a compilation component 64. Such components may allow for grouping of these files during assembly based upon orders received from distributors, post-processing companies, and so forth. The compilation component 64 will typically include programmed computers capable of retrieving the content from storage and properly associating the content into a compiled multimedia file as indicated by reference numeral 66. In the scenario of FIG. 2, the metadata files may not be strictly bound with the content in a wrapper, and therefore the content may require derivation of an identifier as indicated with reference to FIG. 1, and re-association with the metadata file if the link between the two does not exist or is non-functional. Moreover, if any of the content component is later retrieved, because it is not included in a wrapper with the metadata file, the system of FIG. 1 may be used to re-associate the content with the metadata file.

Figure 3:
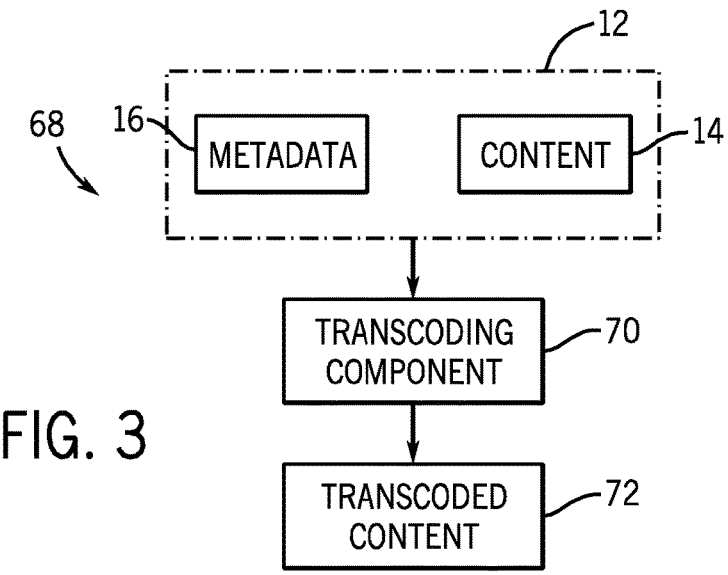
FIG. 3 is a diagrammatical representation of a further alternative scenario in which a metadata file and a content file may be associated with one another.

FIG. 3 represents a further scenario in which the metadata may be dissociated from the content by transcoding. The transcoding scenario 68 may proceed by the use of any transcoding component 70 that may be applied to the content alone or to the content in a wrapper 12 of the type described above. As will be appreciated by those skilled in the art, transcoding typically involves a direct digital-to-digital conversion from one type of encoding to another. Such transcoding may occur during editing, scaling, bitrate, transformation, and so forth. Such transcoding may be common, particularly, when converting the content from one format to another. In such scenarios, the transcoded content 72 may become dissociated from the metadata 16. The system described above with reference to FIG. 1 may then be used to re-associate the transcoded content 72 with the metadata. Where desired, the system may also recognize that the transcoded content is in a different format, has been edited, has been rescaled, or has been otherwise altered, and may alter the metadata accordingly, and even create a separate wrapper for the transcoded content in parallel to the original content 14. In general, the transcoded data will nevertheless include those features that define the persistent identifier based upon which a comparison can be made to re-associate the content with the descriptive metadata as described herein. Moreover, depending upon the degree of information desired, and the particular fingerprinting algorithm utilized, a fingerprint of such transcoded content may identify particular metadata, for example, for a particular transcoded version of the content.

Figure 4:
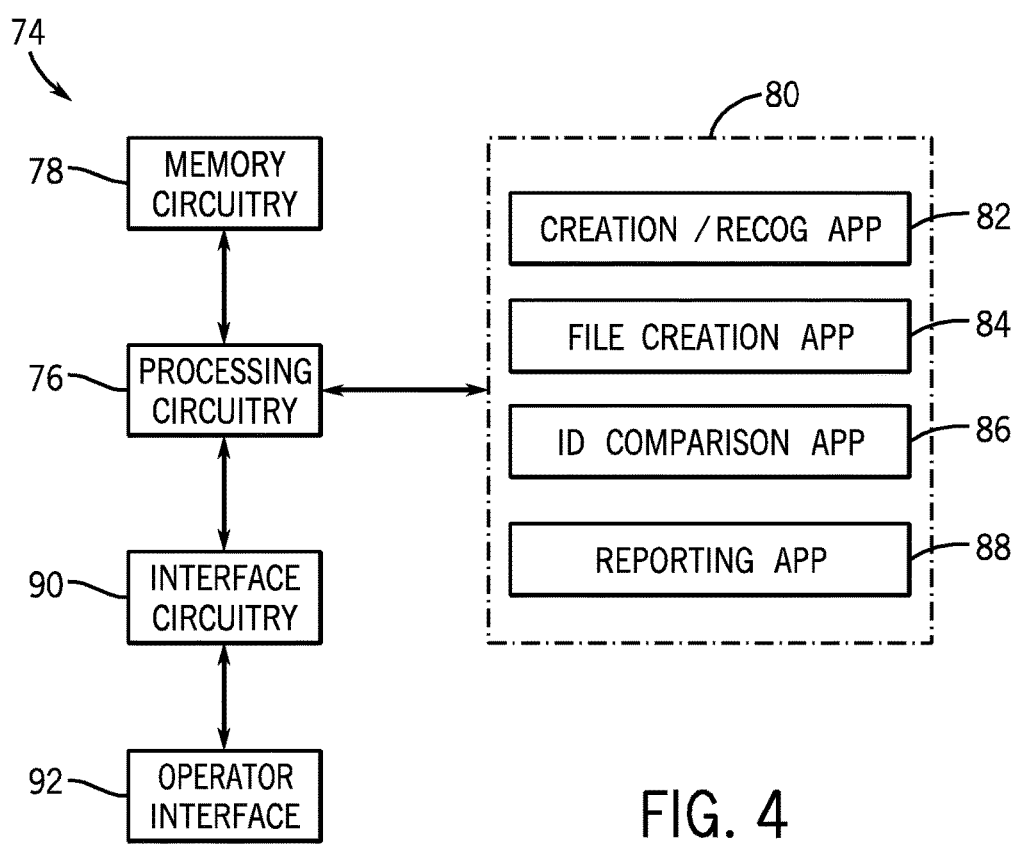
FIG. 4 is a diagrammatical representation of certain functional processing components that may include in a system for carrying out the present technique.

As discussed above, the processing system 10 will typically be carried out and implemented via an appropriately programmed computer system. FIG. 4 represents a computing resource 74 that may be suitable for implementation of the technique. As also noted above, the system may make use of one or more programmed computers, and may use a wide range of such computers connected through one or more networks. The computing resource 74, then, may be thought of as a single computer or as a cooperative grouping of computers designed to carry out the functionalities of the system described above. In general, then, the computing resource 74 will include processing circuitry 76 designed to implement application software stored in one or more memory circuits as indicated by reference numeral 78. Such memory circuitry may include working memory used by the processing circuitry, as well as random access memory, read only memory, long term storage, and so forth. The memory circuitry 78 may also be considered to include high density storage devices such as those used to store libraries of digital content. The processing circuitry 76 will call upon a suite of application programs which may be stored in software and/or firmware. In the illustrated example, these include the identifier creation/recognition application 82, a file creation application 84, an identifier comparison application 86, and a reporting application 88. Some or all of these applications may be, in and of themselves, of a type generally known in the art, but heretofore never associated with one another to carry out the functionality described in the present discussion. The processing circuitry 76 may also include interface circuitry 90 designed to allow for interoperability with an operator interface 92. The interface 92 may be used by a human operator or multiple operators to review content, review metadata, evaluate associations and re-associations of content with metadata, view reports relating to content, portions of content, and so forth that return to a system from a non-compliant environment, and so forth.

Figure 5:
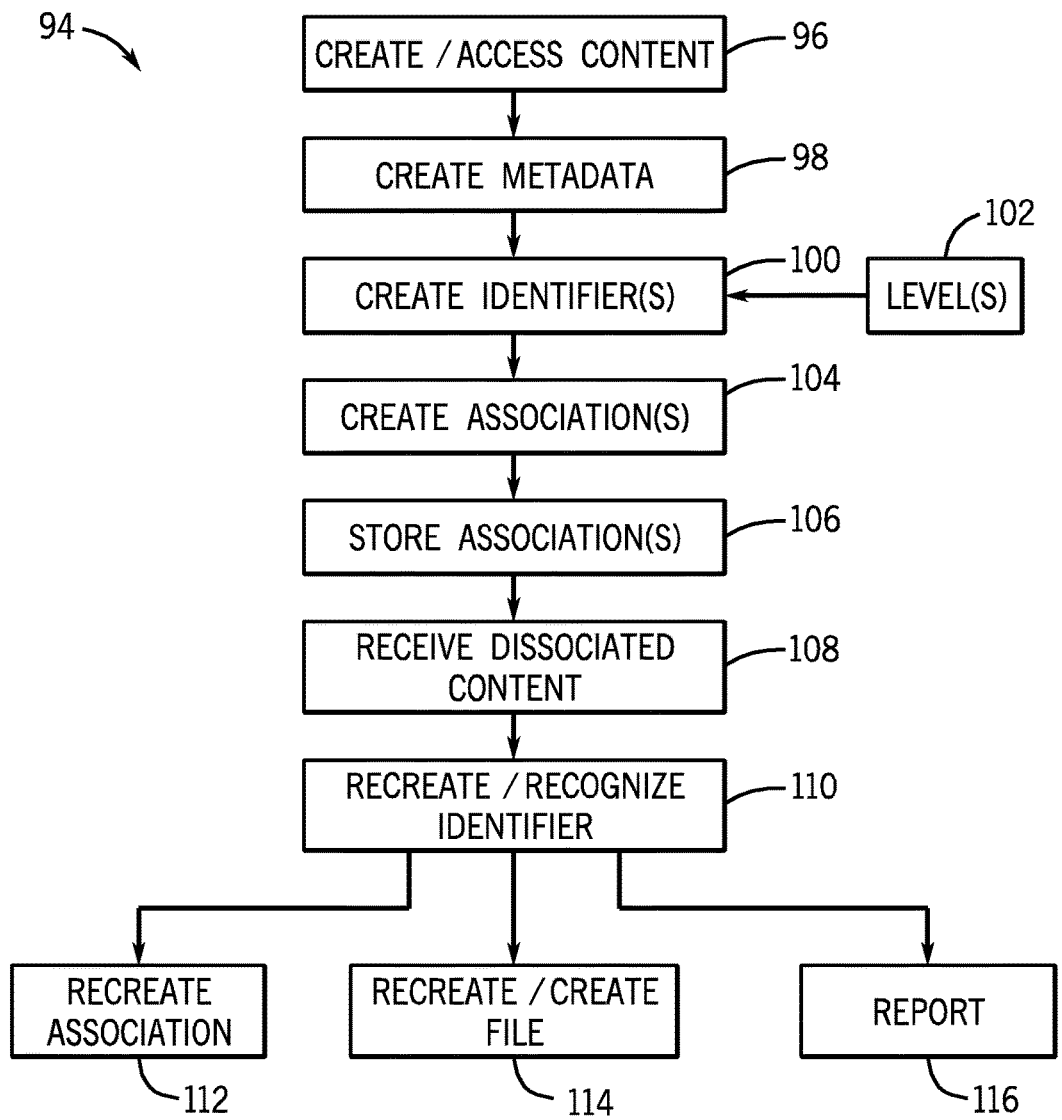
FIG. 5 is a diagrammatical representation of exemplary logic for carrying out the present techniques.

FIG. 5 represents exemplary logic that may be used in the processing described above. The process logic, indicated generally by reference numeral 94, begins with creating or accessing the content as indicated at step 96. This creation process may include any known processes for creation or conversion of content to a digital format, such as digitizing of legacy content, direct creation of digital content, production and post-processing operations, and so forth. Where content is already created and stored in archival storage, step 96 may involve simply retrieving the content.

At step 98, metadata is created that will typically be descriptive of the content or portions of the content. As noted above, the metadata may follow any suitable convention or no convention at all. In most cases, however, it will be desired that the metadata conform to an industry standard and include information such as titles, identifiers, descriptive information, and so forth on the basis of the whole content, portions of the content or, in the case of video content, certain metadata may describe entire video works, portions of works or even an individual frame. At step 100, then, one or more identifiers is created that can be re-created based upon the content. As also noted above, such identifiers may include conventional digital fingerprints, watermarks, or any other identifier that can be readily derived from the content or a portion of the content for re-association. Here again, as indicated at reference numeral 102, such identifiers may be created at multiple levels. This may be particularly useful where audio and visual components may be dissociated from one another, or where individual frames or portions of the content may be extracted or separated from other portions. For example, where certain portions of the content are separated on a frame basis (e.g., for reproduction of individual pictures), multiple level identifiers may be useful for determining whether the content has been so separated and that separated portions, in fact, correspond to the content originally packaged and associated with the metadata.

As indicated by reference numeral 104, then, one or more associations are created between the metadata and the content using the identifiers as a basis for the relationship. These associations may be stored in one or more databases as indicated by reference numeral 106. The databases may be of a type already used in the art, but without the identifiers. It should also be noted that the identifiers themselves may be stored in the database, or data representative of the identifiers or useful in retrieval of the identifiers may be stored. For example, the identifiers may be encoded in various ways and this code stored in or linked to the database for later re-association.

Once the information is stored, various events may result in dissociation of the content from the metadata. As indicated above, this dissociation may result from such events as unauthorized reproduction and transfer of the content alone or a portion of the content, but may also result from the content not actually being packaged with the metadata, or from transcoding of the content, or a combination of these events or other events. The disassociated content received at step 108 is then processed to re-create or recognize the unique identifier as indicated at step 110. Based upon this identifier the content may be re-associated with the metadata in accordance with the association stored in the database. Use of the identifier re-created or recognized at step 110, then, may include the various scenarios, three of which are illustrated in FIG. 5. For example, the association may simply be created or re-created as indicated at step 112, between the content and the stored metadata, on the basis of the identifier. At step 114, similarly, the file or wrapper, if one existed, may be recreated, or a new file or wrapper may be created based upon the content and metadata, based upon the association made via the identifier. Moreover, as indicated at step 116, a report may be generated that serves to inform one or more users that the content has been retrieved, that the content has been modified or altered, that the content is redundant with existing content, and so forth.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for processing digital content comprising:
an identifier creation component configured to create a unique identifier derived from at least a portion of digital content in a content file;
an association component configured to associate metadata with the digital content via the unique identifier;
a database configured to store the association;
a receiving component configured to receive the digital content dissociated from the metadata;
an identifier re-creation component configured to re-create the identifier based upon the received digital content; and
a comparison component configured to compare the re-created identifier with the unique identifier for re-association of the metadata with the digital content.

2. The system of claim 1, wherein the metadata and the digital content are stored in a wrapper prior to dissociation of the digital content from the metadata.

3. The system of claim 1, wherein the metadata includes a pointer to the digital content.

4. The system of claim 1, wherein the metadata is dissociated from the digital content by inclusion of the digital content into a compilation file.

5. The system of claim 1, wherein the metadata is dissociated from the digital content by transcoding of the digital content.

6. The system of claim 1, comprising a reporting component configured to generate a user report indicating the re-association of the metadata and the digital content.

7. The system of claim 1, comprising a file or wrapper creation or re-creation component configured to create or re-create a file or wrapper including the re-associated metadata and digital content.

8. The system of claim 1, wherein the unique identifier corresponds to only a portion of the digital content.

9. The system of claim 8, wherein the digital content includes video content, and wherein the unique identifier corresponds to a frame of the digital content.

10. A method for processing digital content comprising:
creating a unique identifier derived from at least a portion of digital content in a content file;
associating metadata descriptive of the digital content with the digital content via the unique identifier;
storing data representative of the association;
receiving the at least the portion of the digital content dissociated from the metadata;
re-creating the identifier based upon the received at least the portion of the digital content;
comparing the re-created identifier with the unique identifier for re-association of the metadata with the digital content; and
creating or re-creating the association based upon the comparison and the data representative of the association.

11. The method of claim 10, comprising storing in a database data representative of the unique identifier and the metadata.

12. The method of claim 10, wherein the unique identifier comprises a digital fingerprint and/or a digital signature.

13. The method of claim 10, wherein the unique identifier is created based on only a portion of the digital content.

14. The method of claim 13, wherein the digital content includes video content, and wherein the unique identifier corresponds to a frame of the digital content.

15. The method of claim 10, comprising creating a wrapper comprising the metadata and the digital content prior to dissociation of the metadata and the digital content.

16. The method of claim 15, comprising re-creating the wrapper following re-creation of the association.

17. A method for processing digital content comprising:
receiving at least a portion of digital content dissociated from metadata descriptive of the digital content;
re-creating an identifier based upon the received at least the portion of the digital content;
comparing the re-created identifier with a unique identifier stored in a database that associates the digital content with the metadata; and
creating or re-creating an association between the received at least the portion of the digital content and the metadata based upon the comparison.

18. The method of claim 17, wherein the unique identifier comprises a digital fingerprint and/or a digital signature.

19. The method of claim 17, wherein the unique identifier is created based on only a portion of the digital content.

20. The method of claim 17, comprising creating a wrapper comprising the metadata and the at least the portion of the digital content following re-creation of the association.

21. A system for processing digital content comprising:
a database comprising a tangible non-transitory computer readable medium, configured to store data representative of an association between digital content in a content file and metadata based upon a unique identifier of the digital content derived from at least a portion of the digital content;
a receiving component comprising a processor configured to receive the digital content dissociated from the metadata;
an identifier re-creation component comprising a processor configured to re-create the identifier based upon the received digital content; and
a comparison component comprising a processor configured to compare the re-created identifier with the unique identifier for re-association of the metadata with the digital content.

22. At least one machine readable medium comprising executable code for:
creating a unique identifier derived from at least a portion of digital content in a content file;
associating metadata descriptive of the digital content with the digital content via the unique identifier;
storing data representative of the association;
receiving the at least the portion of the digital content dissociated from the metadata;
re-creating the identifier based upon the received at least the portion of the digital content;
comparing the re-created identifier with the unique identifier for re-association of the metadata with the received at least the portion of the digital content; and
creating or re-creating the association based upon the comparison and the data representative of the association.

23. At least one machine readable medium comprising executable code for:

receiving at least a portion of digital content dissociated from metadata descriptive of the digital content;

re-creating an identifier based upon the received at least the portion of digital content;

comparing the re-created identifier with a unique identifier stored in a database that associates the at least the portion of digital content with the metadata; and creating or re-creating an association between the received at least the portion of digital content and the metadata based upon the comparison.

* * * * *